Patented Apr. 27, 1937

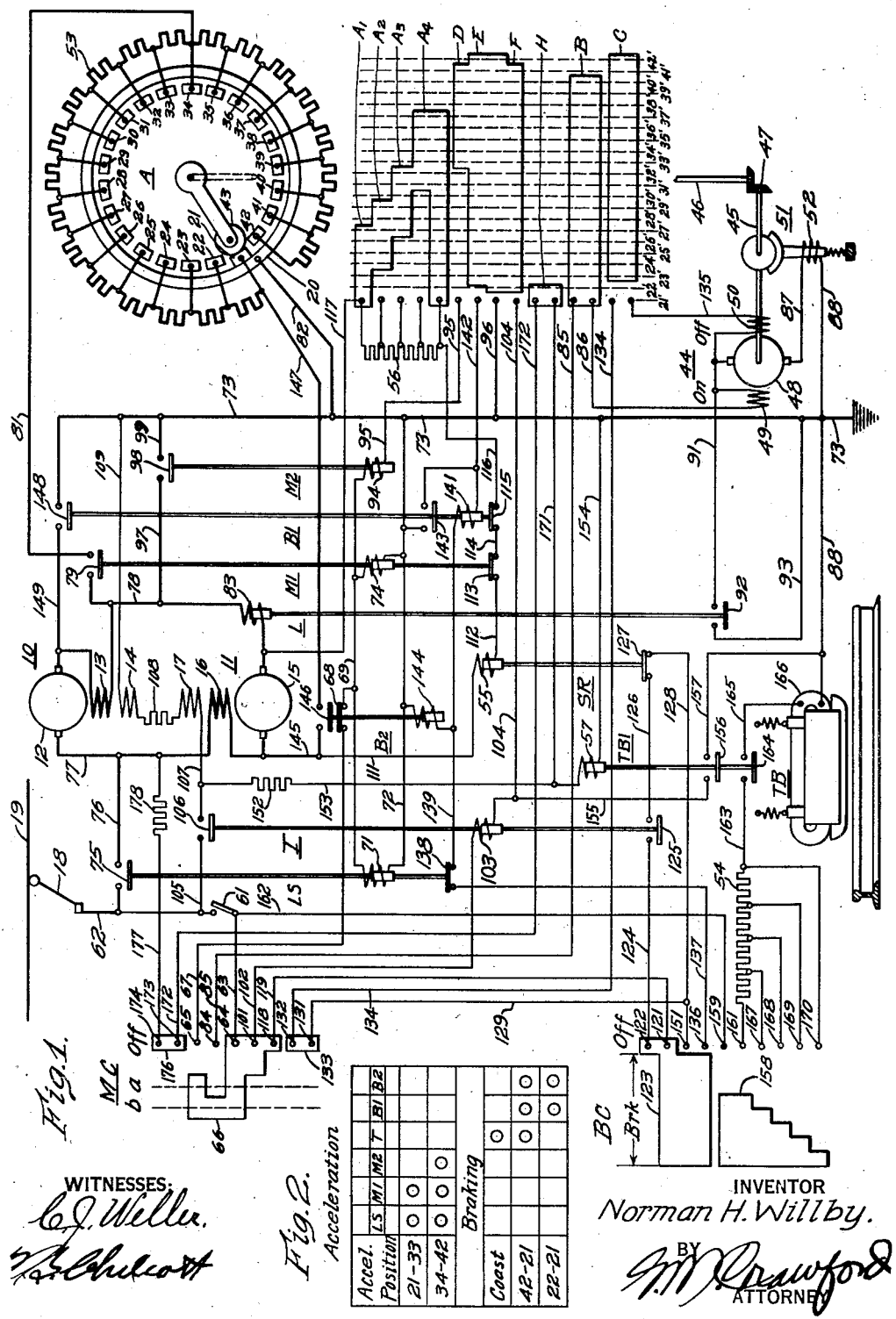

2,078,648

UNITED STATES PATENT OFFICE 2,078,648

MOTOR CONTROL SYSTEM

Norman H. Willby, Irwin, Pa., assignor to Westinghouse Electric & Manufacturing Company, East Pittsburgh, Pa., a corporation of Pennsylvania Application January 4, 1936, Serial No. 57,557

10 Claims. (Cl. 172—179)

My invention relates, generally, to motor control systems and more particularly to systems for controlling the acceleration and the deceleration of electrically propelled vehicles.

An object of my invention, generally stated, is to provide a system for automatically controlling both the acceleration and the deceleration of an electrically propelled vehicle which shall be simple and efficient in operation and which may be economically manufactured and installed.

A more specific object of my invention is to provide for decelerating an electrically propelled vehicle by both dynamic braking and a magnetic track brake.

Another object of my invention is to provide for automatically releasing a magnetic track brake at a predetermined speed of an an electrically propelled vehicle.

A further object of my invention is to provide for coordinating the operation of dynamic braking and magnetic track braking systems.

Other objects of my invention will be explained fully hereinafter or will be apparent to those skilled in the art.

According to the preferred embodiment of my invention, both the acceleration and the deceleration of the propelling motor of an electric vehicle are controlled by an accelerator of the type described in Patent No. 1,991,229, issued February 12, 1935, to L. G. Riley, and assigned to the Westinghouse Electric & Manufacturing Company. The accelerator utilized in the present system comprises a circular copper bus inside of which are disposed a plurality of contact fingers which are progressively forced against the bus by a revolving roller driven by a pilot motor. The contact fingers are connected to a resistor for controlling the current in the motor armature circuit both during acceleration and dynamic braking. The resistor is so connected in the armature circuit that the revolving roller is driven in one direction during acceleration of the motor and in the opposite direction during dynamic braking. Deceleration of the vehicle is also caused by means of a magnetic track brake, the operation of which is coordinated with the dynamic braking system to produce smooth deceleration of the vehicle.

For a fuller understanding of the nature and objects of the invention, reference may be had to the following detailed description, taken in conjunction with the accompanying drawing, in which:

Figure 1 is a diagrammatic view of a control system embodying the invention; and Fig. 2 is a chart, showing the sequence of operation of a portion of the apparatus illustrated in Fig. 1.

Referring to the drawing, electric motors 10 and 11 may be utilized for propelling a vehicle (not shown). The motor 10 is provided with an armature winding 12, a series field winding 13 and a separately excited field winding 14. Likewise, the motor 11 is provided with an armature winding 15, a series field winding 16 and a separately excited field winding 17. The field windings 14 and 17 are utilized during dynamic braking to insure that the braking action will take effect quickly.

An electrically operated line switch LS is provided for connecting the motors 10 and 11 to a trolley 18 which engages a power conductor 19 that may be energized from any suitable source of power, such as a generating station (not shown). The energization of the separately excited field windings 14 and 17 is controlled by a switch T which is closed to connect these field windings to the trolley 18 during coasting and dynamic braking of the vehicle.

Both the acceleration and the deceleration of the motors 10 and 11 is primarily controlled by a motor-driven accelerator A which is of the same general type as the one described in the aforementioned Patent No. 1,991,229. The accelerator A comprises a circular copper bus 20 inside of which are disposed a plurality of contact fingers 21 to 42, inclusive, which are progressively forced against the bus 20 by a revolving roller 43.

The roller 43 is driven by a pilot motor 44 through shafts 45 and 46 connected by bevel gears 47. The pilot motor 44 is provided with an armature winding 48 and two field windings 49 and 50, one for each direction of rotation. A spring actuated brake 51 is provided for stopping the motor 44, a brake release coil 52 being connected in series with the armature winding 48 of the pilot motor and deenergized when the motor is deenergized.

The accelerator A is provided with a resistor 53 that is divided into a number of sub-divisions which are connected to the contact fingers 21 to 42, inclusive. A major portion of the resistor 53 is connected in the armature circuits of the motors 10 and 11 and is utilized to control the armature current during acceleration of the vehicle. The entire resistor 53 may be utilized to control the current flowing in the motor circuit during dynamic braking.

As shown, a number of cam switches A1, A2,

A3, A4, B, C, D, E, F, and H are located in the accelerator and are actuated by the shaft 46. The reference numerals 21' to 42', inclusive, indicate the contact fingers over which the roller 43 travels while the cam switches are closed. The function of the various cam switches will be explained more fully hereinafter.

In addition to the accelerator and the cam switches, several other switches are provided for performing certain switching operations. These switches include a switch M1 for connecting the motors 10 and 11 to the resistor 53 during acceleration, a switch M2 for connecting one terminal of the motors directly to ground after a major portion of the resistor has been shunted from the motor circuit by the accelerator roller 43, switches B1 and B2 for establishing dynamic braking connections for the motors 10 and 11, and a switch TB1 for controlling the operation of a magnetic track brake TB, which is provided for effecting the deceleration of the vehicle in conjunction with the dynamic braking action of the motors 10 and 11.

Drum controllers MC and BC are provided for controlling the motor connections during acceleration and braking, respectively. The controllers are electrically interlocked to prevent improper operation of the equipment. The braking controller BC is also utilized to control the energization of the track brake TB by shunting a resistor 54 from the energizing circuit for the magnetizing coil of the magnetic brake.

A current limit relay L functions in the usual manner to limit the motor current, both during acceleration and dynamic braking, by regulating the operation of the accelerator A. The contact members of the limit relay are disposed to shunt the armature of the pilot motor 44 when closed, thereby stopping the accelerator.

In order to prevent a sudden rush of current upon the re-application of power or dynamic braking after coasting of the vehicle, a spotting relay SR is provided to change the position of the accelerator roller during coasting to approximately match the car speed. The shunt field windings 14 and 17 of the motors 10 and 11, respectively, are energized during coasting by the closing of the switch T to connect the shunt field windings to the power conductor 19. Therefore, the motors develop a voltage which is proportional to the speed of the car.

Since the actuating coil 55 of the relay SR is connected across the armature of the motor 11, the relay is responsive to the speed of the car. As the speed decreases, the contact members of the relay are closed, thereby causing the pilot motor 44 to return the accelerator roller toward the first contact finger. The backward movement of the accelerator operates one of the cam switches A1, A2, A3 or A4 to cut a portion of a resistor 56 out of the relay coil circuit. The contact members of the relay are then opened holding the accelerator until the car speed has been further reduced, when the accelerator is again moved backward by the closing of the relay contacts. This operation is repeated until the master controller is moved out of the coasting position, or until the accelerator is returned to the first position.

As stated hereinbefore, the switch TB1 is provided for deenergizing the magnetic track brake TB when the vehicle has been slowed down to a predetermined speed. In order that the deenergization of the track brake will be responsive to the speed of the vehicle, provision is made for shunting the actuating coil 57 of the switch TB1 through a circuit having a resistance proportional to the voltage of the motors during dynamic braking, which voltage is proportional to the speed of the vehicle. Thus, the switch TB1 is automatically opened to deenergize the track brake when the car is slowed down to a predetermined speed, and the car may be brought to a complete standstill and held there by means of the usual air braking system. In this manner, the possibility of the magnetic track brake being inadvertently left energized while the car is stopped is prevented. Furthermore, smoother deceleration of the vehicle is obtained by avoiding the tendency of the track brake to cause a sudden stopping or jerking of the car when it is moving at a slow speed.

In order that the functioning of the foregoing apparatus may be more clearly understood, the operation of the system will now be described in more detail. Assuming that a control switch 61 has been closed, the motors 10 and 11 may be connected to the power source to start the vehicle by actuating the master controller MC to position "a" to close the switch LS and M1. The energizing circuit for the actuating coil of the switch LS may be traced from a power conductor 62, which is connected to the trolley 18, through the control switch 61, conductor 63, contact fingers 64 and 65, bridged by a contact segment 66 on the master controller MC, conductor 67, an interlock 68 on the switch B2, conductor 69, the actuating coil 71 of the switch LS, and conductor 72 to the grounded conductor 73. The energizing circuit for the actuating coil of the switch M1 extends from the previously energized conductor 69 through the actuating coil 74 of the switch M1 and conductor 72 to the grounded conductor 73.

The closing of the switches LS and M1 connects the motors 10 and 11 to the power source in parallel circuit relation and in series with a major portion of the resistor 53 in the accelerator A. The circuit through the motor 10 may be traced from the power conductor 62 through contact members 75 of the switch LS, conductors 76 and 77, the armature winding 12, series field winding 13, conductor 78, contact members 79 of the switch M1, conductor 81, the resistor 53, contact finger 21, which is compressed against the bus 20 by the roller 43 and conductor 82 to the grounded conductor 73. The circuit through the motor 11 extends from conductor 77 through the series field winding 16, the armature winding 15, the actuating coil 83 of the limit relay L to conductor 78 and thence through the circuit previously traced to the grounded conductor 73. Since the resistor 53 is connected in series with the motors, the vehicle will be operated at a slow rate of speed.

If it is desired to accelerate the vehicle, the master controller MC may be actuated to position "b", thereby energizing the pilot motor 44 which operates the roller 43 to cut the resistor 53 out of the motor circuit, the operation of the motor 44 being under the control of the limit relay L in a manner well known in the art. The energizing circuit for the pilot motor 44 may be traced from contact finger 84, which engages the contact segment 66, through conductor 85, the cam switch B in the accelerator A, conductor 86, the field winding 49 of the pilot motor 44, the armature winding 48, conductor 87, the release coil 52 of the brake 51, and conductor 88 to the grounded conductor 73. As explained hereinbefore, the energization of the coil 52 releases the brake 51 which permits the motor 44 to operate the accelerator A.

The rotation of the roller 43 compresses the contact fingers on the accelerator against the bus 20 to shunt the resistor 53 from the motor circuit as described hereinbefore. The shunting of a portion of the resistor 53 will permit the motor current to increase to a value which will operate the limit relay L to establish a shunt circuit around the armature of the motor 44 and the brake release coil 52, thereby stopping the accelerator. The shunt circuit may be traced from one terminal of the armature 48 through conductor 91, contact members 92 on the limit relay L, and conductor 93 to the grounded conductor 73. When the main motors have accelerated to a speed which will cause the motor current to be reduced to a value that will permit the limit relay L to open its contact members, the pilot motor 44 advances the accelerator to cut more resistance out of the main motor circuit, thereby causing the motors to be accelerated still further.

This operation is continued until the accelerator roller 43 reaches contact finger 33, at which time the cam switch D is closed to energize the actuating coil of the switch M2. The energizing circuit for the coil of the switch M2 may be traced from the previously energized conductor 69 through the actuating coil 94, conductor 95, the cam switch D and conductor 96 to the grounded conductor 73. The closing of the switch M2 connects the motors 10 and 11 directly to ground through conductor 97, contact members 98 of the switch M2 and conductor 99 to the grounded conductor 73, thereby causing maximum voltage to be applied to the motors.

However, the pilot motor 44 will continue to advance the roller 43 to contact finger 42 in order that the full amount of the resistor 53 will be available for controlling the motor current during dynamic braking of the motors. The advancement of the roller 43 is stopped by the opening of the cam switch B to deenergize the pilot motor 44.

Assuming that it is desired to permit the vehicle to coast, the master controller MC may be actuated to the "off" position, thereby opening the switches LS, M1 and M2 to disconnect the motors 10 and 11 from the power source. At this time, the switch T is closed to connect the field windings 14 and 17 to the power source, thereby separately exciting these windings and causing the motors 10 and 11 to generate a voltage proportional to the speed of the vehicle. The energizing circuit for the actuating coil of the switch T may be traced from a contact finger 101, which engages the contact segment 66, through conductor 102, actuating coil 103 of the switch T, conductor 104, the cam switch F and conductor 96 to the grounded conductor 73. The circuit through the field windings 14 and 17 may be traced from the power conductor 62 through conductor 105, the contact members 106 of the switch T, conductor 107, field winding 17, a resistor 108, the field winding 14, and conductor 109 to the grounded conductor 73.

As explained hereinbefore, the relay SR, which is connected across the armature of the motor 11, functions to match the position of the accelerator of roller 43 with the speed of the vehicle in order that the proper amount of the resistor 53 will be available for controlling the motor current in the event that dynamic braking is established. The energizing circuit for the actuating coil of the relay SR may be traced from one terminal of the armature winding 15 of the motor 11 through conductor 111, the actuating coil 55 of the relay SR, conductor 112, an interlock 113 on the switch M1, conductor 114, an interlock 115 on the switch B1, conductor 116, the resistor 56 and conductor 117 to the other terminal of the armature winding 15.

When the vehicle is coasting at a relatively high speed, energization of the relay SR causes its contact members to be opened and the accelerator roller 43 remains on the last contact finger 42. As the speed of the vehicle decreases, the voltage produced by the motor 11 will decrease and the contact members of the relay SR are permitted to close, thereby causing the pilot motor 44 to operate the roller 43 in a counterclockwise direction. The energizing circuit for the pilot motor 44 may be traced from a contact finger 118 on the master controller MC through conductor 119, contact fingers 121 and 122, bridged by a contact segment 123 on the braking controller BC, conductor 124, an interlock 125 on the switch T, conductor 126, contact members 127 on the relay SR, conductors 128 and 129, contact fingers 131 and 132, bridged by a segment 133 on the controller MC, conductor 134, the cam switch C on the accelerator A, conductor 135, the field winding 50 and the armature winding 48 of the pilot motor 44, conductor 87, the brake release coil 52 and conductor 88 to the grounded conductor 73.

As described hereinbefore, the backward movement of the accelerator A causes the cam switch A4 to cut a portion of the resistor 56 out of the circuit for the actuating coil of the spotting relay SR, thereby causing the contact members of the relay to be opened to stop the accelerator until the speed of the vehicle has decreased still further, when the foregoing operation is repeated. In this manner, the spotting relay SR and the cam switches A1 to A4, inclusive, cooperate to match the position of the accelerator roller with the speed of the vehicle, thereby insuring that the proper amount of resistance 53 will be available to control the motor current in the event that dynamic braking is established or power is reapplied to the motors 10 and 11 by reconnecting them to the power source.

If it is desired to decelerate the vehicle by means of dynamic braking, the braking controller BC may be actuated to one of the braking positions to close the switches B1 and B2 to establish the dynamic braking connections provided the controller MC is in the "off" position. The energizing circuit for the actuating coil of the switch B1 may be traced from a contact finger 136, which engages the contact segment 123 of the braking controller BC, through conductor 137, an interlock 138 on the switch LS, conductor 139, the actuating coil 141 of the switch B1, conductor 142, the cam switch E, and conductor 96 to the grounded conductor 73. A holding circuit for the coil 141 is established through an interlock 143 by the closing of the switch B1. The holding circuit may be traced from the conductor 142 through the interlock 143 and conductor 72 to the grounded conductor 73. The energizing circuit for the actuating coil of the switch B2 extends from the previously energized conductor 139 through the actuating coil 144 of the switch B2 and conductor 72 to the grounded conductor 73.

The closing of the switches B1 and B2 establishes dynamic braking connections for the motors 10 and 11 whereby the series field winding of one motor is connected across the armature winding of the other motor in a manner to cause the motors to function as generators to retard the movement of the vehicle. The circuit for the motor 10 may be traced from one terminal of the armature winding 12 through conductor 77, the field winding 16 of the motor 11, conductor 145, contact members 146 of the switch B2, conductor 147, the resistor 53, the contact finger 42, assuming that the accelerator roller 43 is on the finger 42, the bus 20, conductors 82 and 73, contact members 148 of the switch B1 and conductor 149 to the other terminal of the armature winding 12. The circuit for the motor 11 may be traced from one terminal of the armature winding 15 through conductor 145, the contact members 146 of the switch B2, conductor 147, the resistor 53, contact finger 42, the bus 20, conductors 82 and 73, the contact members 148 of switch B1, conductor 149, the field winding 13 of the motor 10, conductor 78, and the actuating coil of the limit relay 83 to the other terminal of the armature winding 15.

Since the switch T was closed when the master controller MC was actuated to the "off" position, the field windings 14 and 17 of the motors 10 and 11, respectively, are also energized at this time, thereby insuring that the circulating current builds up rapidly and the dynamic braking action takes effect quickly. The braking current is controlled by means of the accelerator resistor 53 in the same manner as during acceleration of the motors, the operation of the pilot motor being under control of the limit relay L. The pilot motor 44 is operated in a direction to cause the accelerator A to decrease the resistance in the dynamic braking circuit as the speed of the vehicle decreases. The energizing circuit for the pilot motor 44 extends from contact finger 151 on the braking controller BC which is connected to the conductor 128 and thence to the pilot motor 44 through the circuit previously traced.

If it is desired to utilize the magnetic track brake TB to aid the dynamic braking action of the motors 10 and 11 in stopping the vehicle, the braking controller BC may be actuated to a position in which the magnetizing coil of the track brake is energized. Since the switch T has been previously closed, an energizing circuit is established for the actuating coil of the switch TB1. Therefore, this switch is closed at this time. The circuit for the coil of the switch TB1 may be traced from the power conductor 62 through conductor 105, contact members 106 of the switch T, conductor 107, a resistor 152, conductor 153, the actuating coil 57 of the switch TB1 and conductor 154 to the grounded conductor 73.

The closing of the switch TB1 establishes an energizing circuit for the magnetizing coil of the track brake TB, provided the braking controller BC is actuated to a position to energize the track brake. The closing of the switch TB1 also establishes a holding circuit for the actuating coil of the switch T. This circuit may be traced from conductor 104 through conductor 155, an interlock 156 on the switch TB1, conductors 157 and 88 to the grounded conductor 73.

When the braking controller BC is actuated to a position in which its contact segment 158 bridges contact fingers 159 and 161, the magnetizing coil of the track brake TB is connected across the power source in series with the resistor 54 through a circuit which extends from the control switch 61 through conductor 162, contact fingers 159 and 161 bridged by the segment 158, the resistor 54, conductor 163, contact members 164 on the switch TB1, conductor 165, the magnetizing coil 166, and conductor 88 to the grounded conductor 73.

If it is desired to increase the effect of the magnetic track brake, the braking controller BC may be advanced to shunt the resistor 54 from the circuit for the magnetizing coil of the track brake, thereby increasing the magnetizing effect of the coil and the braking action of the track brake. The resistor 54 may be shunted step-by-step by actuating the controller BC to cause the contact segment 158 to be successively engaged by the contact fingers 167 to 170, inclusive.

In order that the magnetic track brake TB will be completely deenergized when the vehicle has slowed down to a predetermined speed, provision is made for establishing a shunt circuit around the actuating coil 57 of the switch TB1 through the armature winding of the motor 10. Since the voltage developed by the motor 10 during dynamic braking is proportional to the speed of the vehicle, the effective resistance of the shunt circuit around the actuating coil 57 is also proportional to the speed of the vehicle. As the speed of the vehicle decreases, the effective resistance of the shunt circuit around the coil 57 is gradually decreased until there will be insufficient current flowing through the coil 57 to hold the switch TB1 closed.

When the contact members of the switch are opened, the magnetizing coil of the track brake TB is deenergized, thereby preventing the coil from being left energized after the vehicle has been stopped. The shunt circuit around the coil 57 may be traced from the conductor 153 through conductor 171, the cam switch H, conductor 172, contact fingers 173 and 174 bridged by contact segment 176 of the master controller MC, conductor 177, resistor 178, conductor 77, the armature winding 12 of the motor 10, conductor 149, and contact members 148 of the switch B1 to the grounded conductor 73.

Thus, it will be seen that when the voltage of the motor 12 decreases to a predetermined value, the actuating coil 57 of the switch TB1 will be by-passed to ground through a circuit having a lower resistance than the circuit through the actuating coil 57, which will cause the switch TB1 to be opened as previously described. The vehicle may be brought to a complete standstill by means of the usual air braking system (not shown).

From the foregoing description, it is apparent that I have provided for coordinating the operation of a dynamic braking system and a magnetic track brake to quickly and smoothly decelerate an electrically propelled vehicle. Also, it is apparent that I have provided for automatically releasing a magnetic track brake at a predetermined speed of the vehicle, thereby preventing an excessive use of electric power for operating the track brake and also preventing injury to the magnetizing element of the brake.

Since many modifications may be made in the apparatus and arrangement of parts without departing from the spirit of my invention, I do not wish to be limited other than by the scope of the appended claims.

I claim as my invention:
1. In a motor control system, in combination, a motor for propelling a vehicle, means for establishing dynamic braking connections for the motor, a magnetic track brake for decelerating the vehicle, and means responsive to the speed of the vehicle during dynamic braking for deenergizing the track brake.

2. In a motor control system, in combination, a motor for propelling a vehicle, switching means for establishing dynamic braking connections for the motor, a magnetic track brake for decelerating the vehicle, control means for controlling the operation of said switching means and the energization of the magnetic track brake, and means responsive to the speed of the vehicle during dynamic braking for deenergizing the track brake.

3. In a motor control system, in combination, a motor for propelling a vehicle, switching means for establishing dynamic braking connections for the motor for decelerating the vehicle, a magnetic track brake for aiding in the deceleration of the vehicle, and means responsive to the voltage of the motor during dynamic braking for deenergizing the track brake.

4. In a motor control system, in combination, a motor for propelling a vehicle, switching means for establishing dynamic braking connections for the motor for decelerating the vehicle, a magnetic track brake for aiding in the deceleration of the vehicle, control means for coordinating the operation of the dynamic braking means and said magnetic track brake, and means responsive to the voltage of the motor during dynamic braking for deenergizing the track brake.

5. In a motor control system, in combination, a motor for propelling a vehicle, switching means for establishing dynamic braking connections for the motor for decelerating the vehicle, a magnetic track brake for aiding in the deceleration of the vehicle, and switching means for controlling the energization of the magnetic track brake, said switching means being responsive to the voltage of the motor during dynamic braking.

6. In a motor control system, in combination, a motor for propelling a vehicle, resistance varying means for controlling the motor current during acceleration of the vehicle, switching means for establishing dynamic braking connections for the motor to decelerate the vehicle, said resistance varying means being utilized to control the motor current during dynamic braking, a magnetic track brake for aiding in the deceleration of the vehicle, switching means for controlling the energization of the magnetic track brake, and switching means associated with said resistance varying means for controlling the operation of said switching means for controlling the energization of the magnetic track brake.

7. In a motor control system, in combination, a motor for propelling a vehicle, resistance varying means for controlling the motor current during acceleration of the vehicle, means for exciting the motor during coasting of the vehicle, switching means for establishing dynamic braking connections for the motor to decelerate the vehicle, said resistance varying means being utilized to control the motor current during dynamic braking, and means responsive to the voltage of the motor for controlling the operation of the resistance varying means during coasting of the vehicle.

8. In a motor control system, in combination, a motor for propelling a vehicle, resistance varying means for controlling the motor current during acceleration of the vehicle, means for exciting the motor during coasting of the vehicle, switching means for establishing dynamic braking connections for the motor to decelerate the vehicle, said resistance varying means being utilized to control the motor current during dynamic braking, and relay means responsive to the voltage of the motor for controlling the operation of the resistance varying means during coasting of the vehicle.

9. In a motor control system, in combination, a motor for propelling a vehicle, resistance varying means for controlling the motor current during acceleration of the vehicle, means for exciting the motor during coasting of the vehicle, switching means for establishing dynamic braking connections for the motor to decelerate the vehicle, said resistance varying means being utilized to control the motor current during dynamic braking, relay means responsive to the voltage of the motor for controlling the operation of the resistance varying means during coasting of the vehicle, and means for governing the operation of said relay means.

10. In a motor control system, in combination, a motor for propelling a vehicle, resistance varying means for controlling the motor current during acceleration of the vehicle, means for exciting the motor during coasting of the vehicle, switching means for establishing dynamic braking connections for the motor to decelerate the vehicle, said resistance varying means being utilized to control the motor current during dynamic braking, relay means responsive to the voltage of the motor for controlling the operation of the resistance varying means during coasting of the vehicle, and means associated with said resistance varying means for governing the operation of said relay means.

NORMAN H. WILLBY.